US011859384B1

(12) United States Patent
Naneng et al.

(10) Patent No.: US 11,859,384 B1
(45) Date of Patent: Jan. 2, 2024

(54) ENGINEERED WOOD PRODUCT

(71) Applicants: Terence Naneng, Hooper Bay, AK (US); William Naneng, Hooper Bay, AK (US)

(72) Inventors: Terence Naneng, Hooper Bay, AK (US); William Naneng, Hooper Bay, AK (US)

( * ) Notice: Subject to any disclaimer, the term of this patent is extended or adjusted under 35 U.S.C. 154(b) by 336 days.

(21) Appl. No.: 16/599,604

(22) Filed: Oct. 11, 2019

(51) Int. Cl.

| | |
|---|---|
| ***E04C 2/24*** | (2006.01) |
| ***B32B 21/08*** | (2006.01) |
| ***B32B 21/02*** | (2006.01) |
| ***B32B 27/36*** | (2006.01) |

(52) U.S. Cl.
CPC ................ *E04C 2/24* (2013.01); *B32B 21/02* (2013.01); *B32B 21/08* (2013.01); *B32B 27/36* (2013.01); *E04C 2/243* (2013.01); *B32B 2250/03* (2013.01); *B32B 2255/10* (2013.01); *B32B 2255/205* (2013.01); *B32B 2307/304* (2013.01); *B32B 2307/518* (2013.01); *B32B 2607/00* (2013.01)

(58) Field of Classification Search
CPC . E04C 2/24; E04C 2/243; B32B 21/02; B32B 21/08; B32B 27/36; B32B 2250/03; B32B 2255/10; B32B 2255/205; B32B 2307/304; B32B 2307/518; B32B 2607/00
See application file for complete search history.

(56) References Cited

U.S. PATENT DOCUMENTS

| | | | | |
|---|---|---|---|---|
| 520,123 | A * | 5/1894 | Sackett | |
| 2007/0243396 | A1* | 10/2007 | Buchbinder ........... | D21H 27/36 428/457 |
| 2008/0245007 | A1* | 10/2008 | McDonald ............. | E04C 2/284 52/309.5 |
| 2015/0251486 | A1* | 9/2015 | Hannig .................... | B41M 3/06 428/172 |

OTHER PUBLICATIONS

Sackett, Augustine; Inside Wall Covering; May 22, 1894; pp. 1-3 (Year: 1894).*

* cited by examiner

*Primary Examiner* — Frank J Vineis
*Assistant Examiner* — Laura B Figg
(74) *Attorney, Agent, or Firm* — Michael J. Tavella

(57) ABSTRACT

A wall panel that has a reflective barrier of an aluminized biaxially-oriented polyethylene terephthalate (BPET) between an OSB panel, and an industrial grade paper (which is pressed to look like natural wood grain). The aluminized BPET can be integrated into the industrial paper to become one sheet. This wall panel could be applied to interior paneling, drywall or gypsum board, as desired. Another option is to sandwich the aluminized BPET between the industrial paper and the reflective barrier, a layer of self-sealing asphalt. This makes the wall panel waterproof and airtight and helps to keep intact the engineered wood integrity. The aluminized BPET could go between a layer of insulation or particle board and its laminate. The panel's BPET should have a flap of an inch or so on one side to helpwith air sealing. This creates a barrier between varying (Continued)

12a

10

12

13

11 temperatures, and adds an R value, and helps keep a building cool.

18 Claims, 8 Drawing Sheets

ENGINEERED WOOD PRODUCT

STATEMENT REGARDING FEDERALLY SPONSORED RESEARCH AND DEVELOPMENT

Not Applicable

BACKGROUND OF THE INVENTION

1. Field of the Invention

This invention relates to engineered wood products and particularly to engineered wood products having a layer of aluminum coated MYLAR®.

2. Description of the Prior Art

Engineered wall products have been used for some time. Typically, these products have multiple layers covered by at least one surface material that can be pressed to impart a natural wood grain appearance. Such wall panels use drywall with some type of insulation and industrial grade paper that is pressed to create a wood grain. Often these panels use a composite wood sheet such as oriented strand board (OSB). These panels often lack effective levels of insulation because they are thin and there is little room to properly insulate the panels.

BRIEF DESCRIPTION OF THE INVENTION

The instant invention overcomes the difficulties described above. It is a wall panel that has a reflective barrier of an aluminized biaxially-oriented polyethylene terephthalate (BPET) or MYLAR®. between an OSB panel, and an industrial grade paper (which pressed to look like natural wood grain). This creates a barrier between varying temperatures, and adds an R value, and helps keep a building cool. The aluminized BPET can be integrated into the industrial paper to become one sheet.

This wall panel can be applied to interior paneling, or drywall, as desired.

Another option is to sandwich the aluminized BPET between the industrial paper, a reflective barrier, and a layer of self-sealing asphalt. This makes the wall panel waterproof and airtight and helps to keep intact the engineered wood integrity.

In addition, the aluminized BPET could go between a layer of insulation or particle (chipped) wood and its laminate. The engineered wood panel's Mylar should have a flap of an inch or so on one side and the top to help with air sealing.

Finally, the aluminized BPET sheets can be used by applying it just during manufacturing of engineered wood. This would be an aftermarket application to any board, panel or plywood, both exterior and interior. The application of the aluminized BPET and industrial paper, or similar material, would be applied by either a wholesaler, retailer or a contractor upon the request by customer.

DETAILED DESCRIPTION OF THE INVENTION

Figure 1:
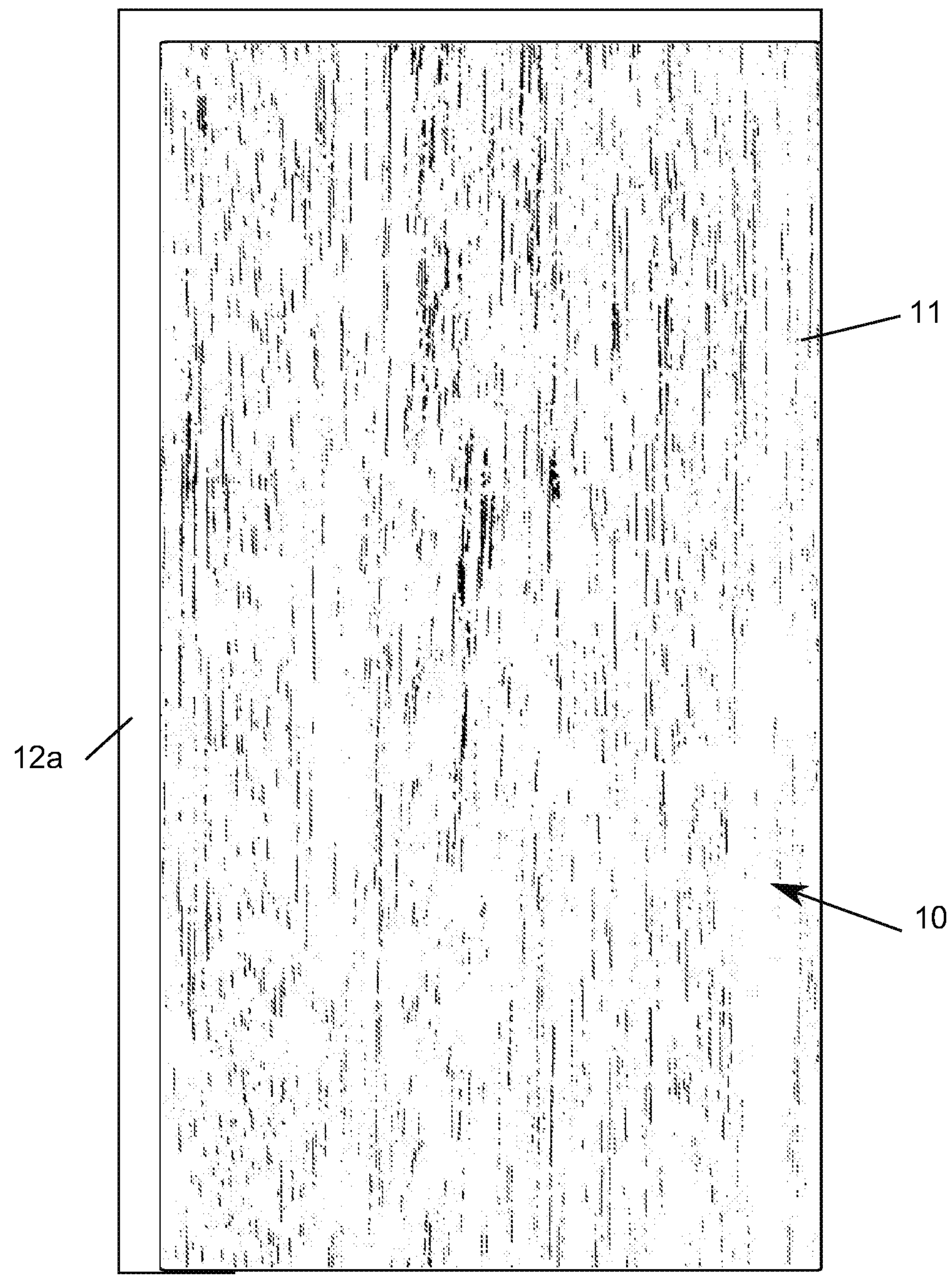
FIG. 1 is a front view of the invention, showing the wood grain paper portion of the panel.
Figure 2:
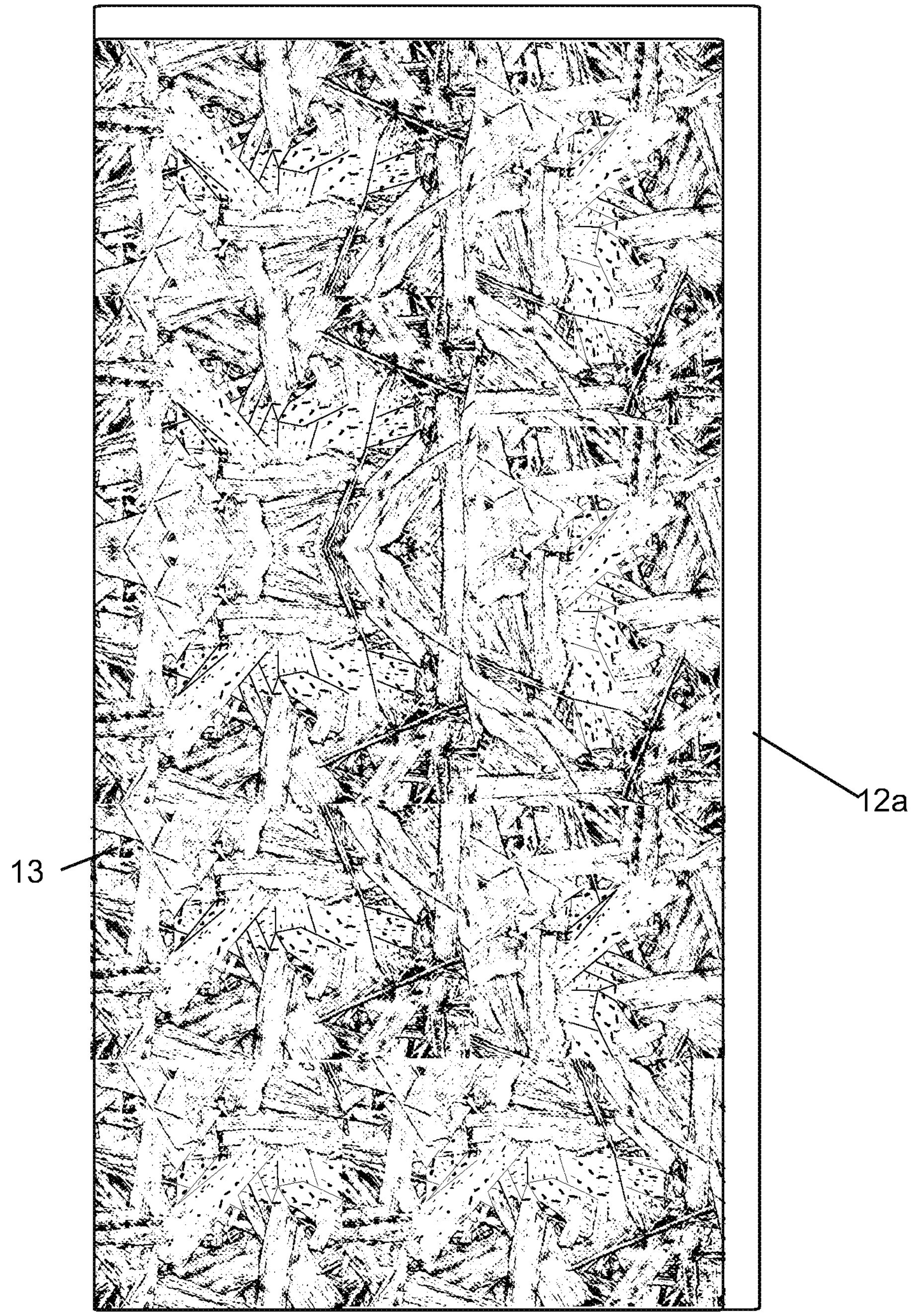
FIG. 2 is a rear view of the invention, showing the OSB portion of the panel.
Figure 3:
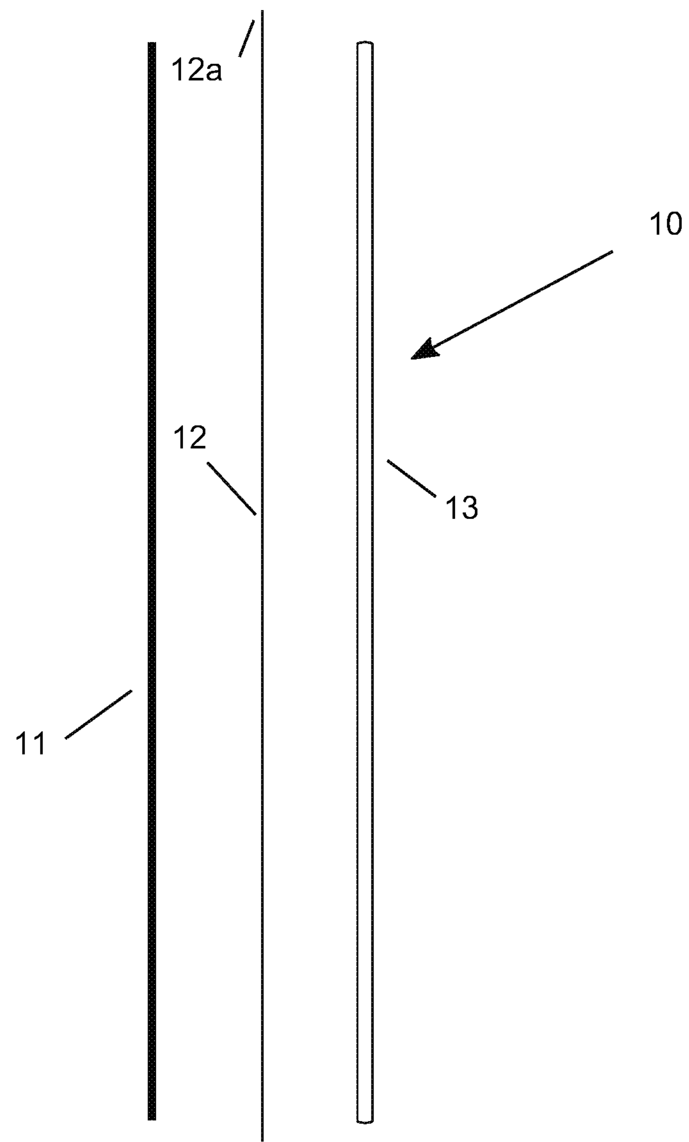
FIG. 3 is a side exploded side view of the invention, showing the layers that make up a panel.

Referring now to the drawings, and especially FIGS. 1, 2 and 3, the invention 10, in the preferred embodiment, consists of a panel that has three layers. The first is an industrial grade paper 11, which pressed to look like natural wood grain. The second is a sheet of aluminized biaxially-oriented polyethylene terephthalate (BPET) 12 that is attached to the industrial grade paper 11. As noted above, this combination creates a barrier between varying temperatures, and adds an R value. The aluminized BPET sheet 12 can be integrated into the industrial paper 11 to become one sheet, as well. The third layer is a layer of OSB board 13 (see FIGS. 2 and 3). The OSB board is a thin sheet that is used to give the aluminized BPET sheet 12 and industrial paper 11 form and structure.

Once assembled, the wall panel can be applied to interior paneling, drywall or gypsum board, as desired.

Figure 4:
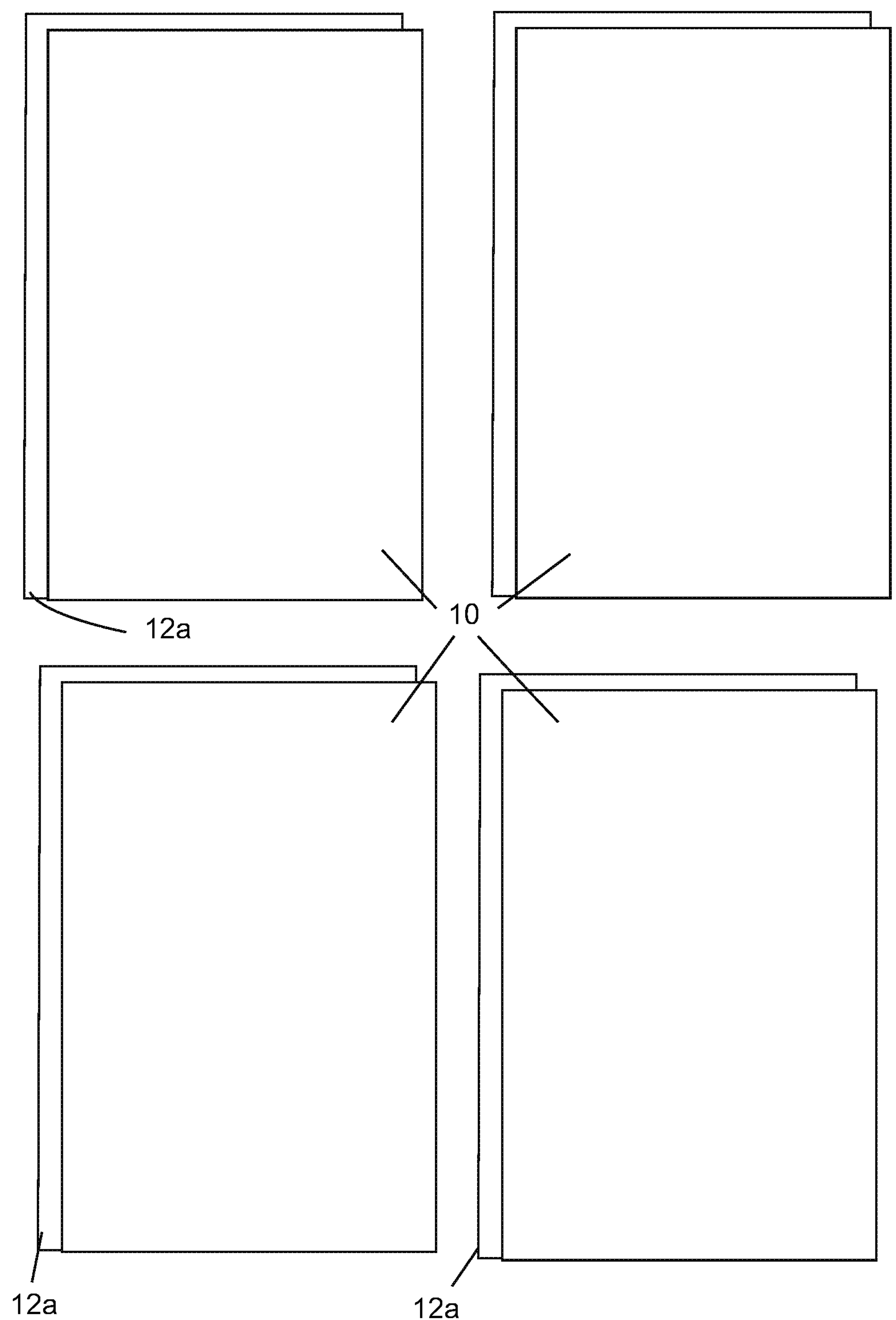
FIG. 4 is a detail view showing four panels arrayed for installation.

As shown in FIGS. 1 and 2, the aluminized BPET sheet 12 should have an extension flap 12*a* of an inch or so on one side and the top of the sheet to help with air sealing. The use of this flap 12*a* is shown in FIGS. 4-6, as discussed below:

FIG. 4 is a detail view showing four panels 10 arrayed for installation. Note the overlap 12*a*, which is shown larger than actual size for illustrative purposes.

Figure 5:
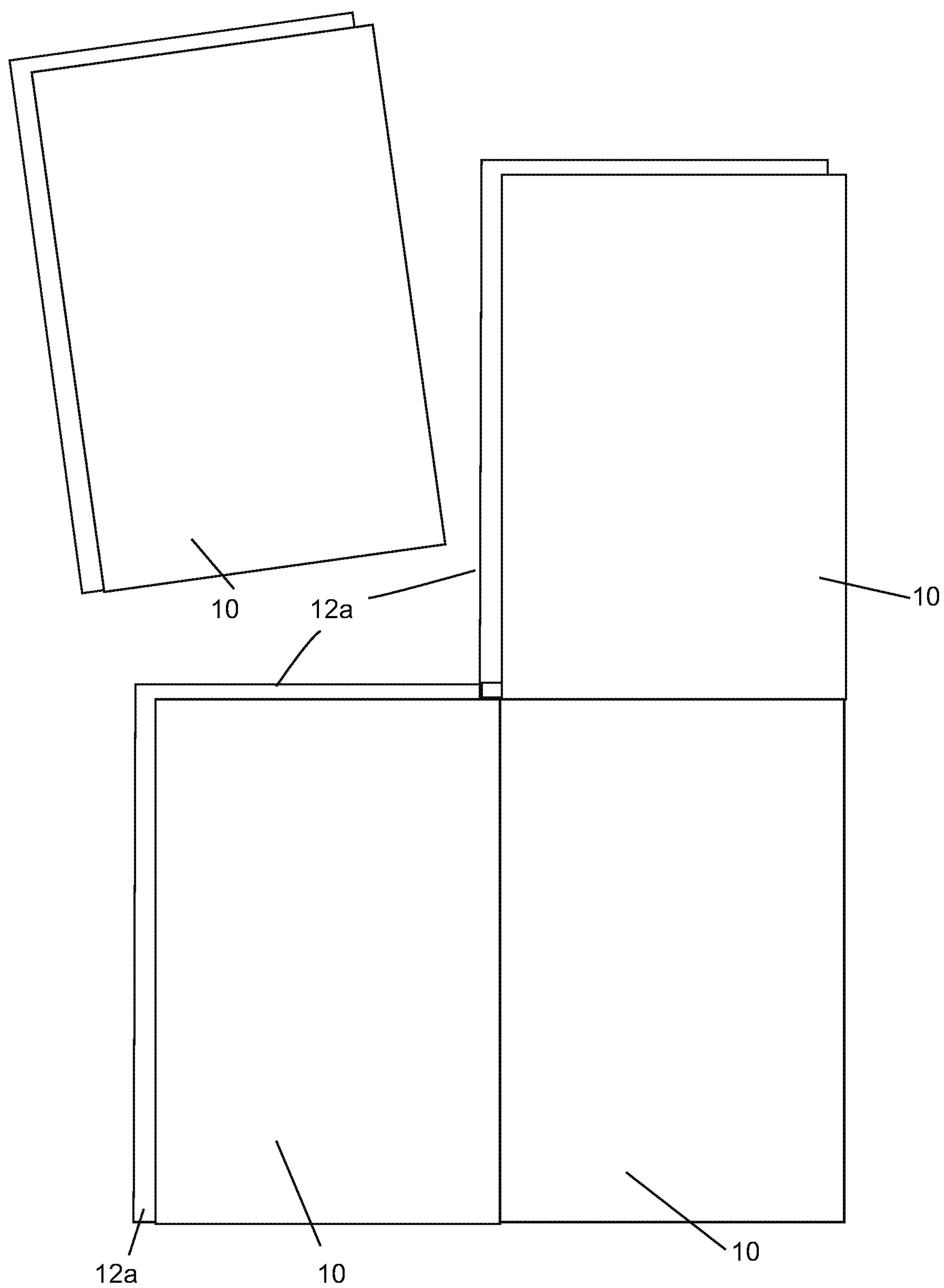
FIG. 5 is a detail view of the panels of FIG. 4 with three panels being attached and the fourth being moved into position.
Figure 6:
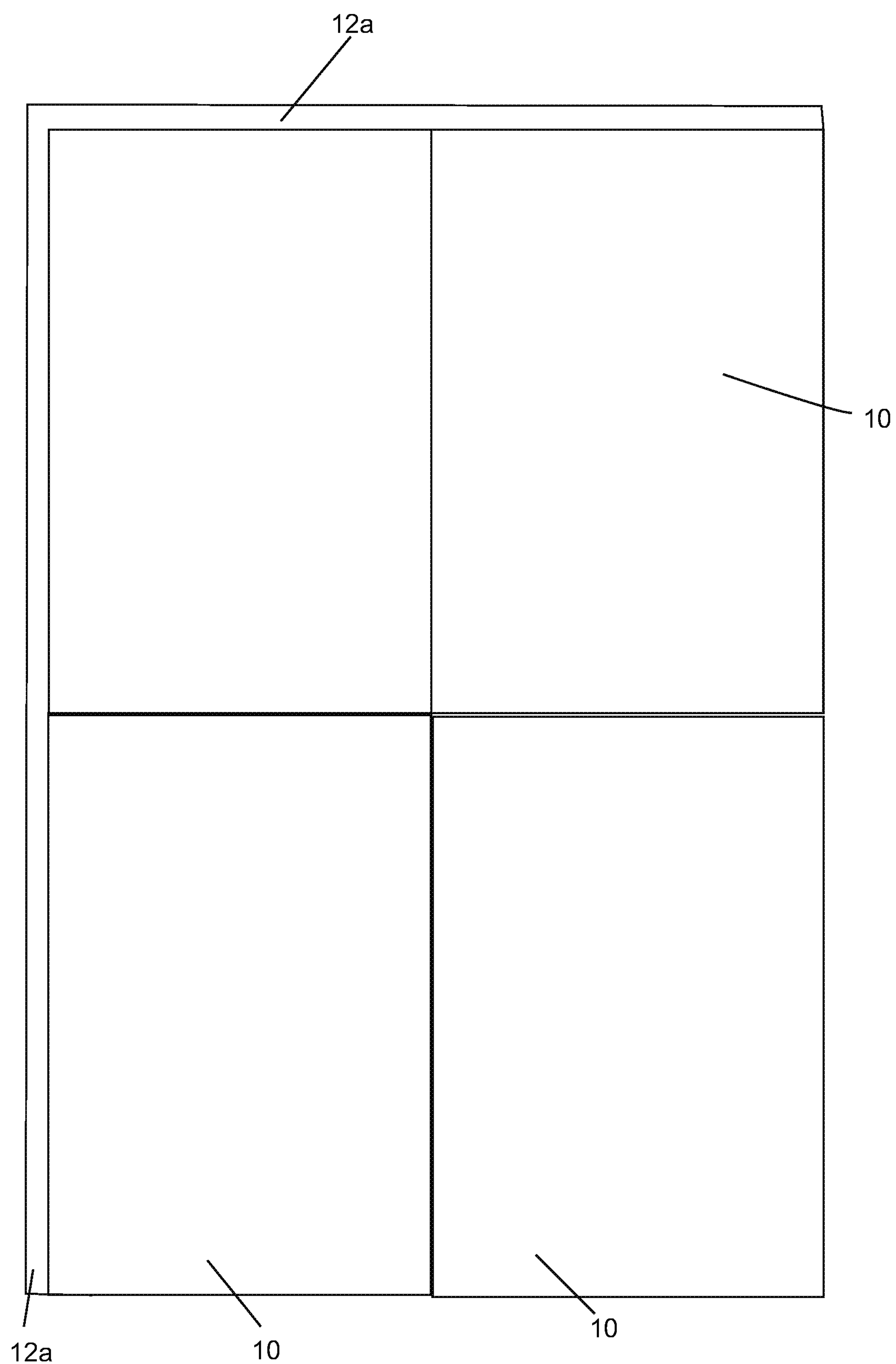
FIG. 6 is a detail view of the panels of FIG. 4 fully assembled.

FIG. 5 is a detail view of the panels of FIG. 4 with three panels being attached and the fourth being moved into position. In this figure, three of the panels are attached Note how the panels 10 cover the overlap 12*a*. In this way, the overlap seals the seams 10*a* between the panels. FIG. 6 is a detail view of the panels of FIG. 4 fully assembled. This figure shows how the assembled panels cover the overlap between them, thereby completely sealing the seams 10*a* between them.

Figure 7:
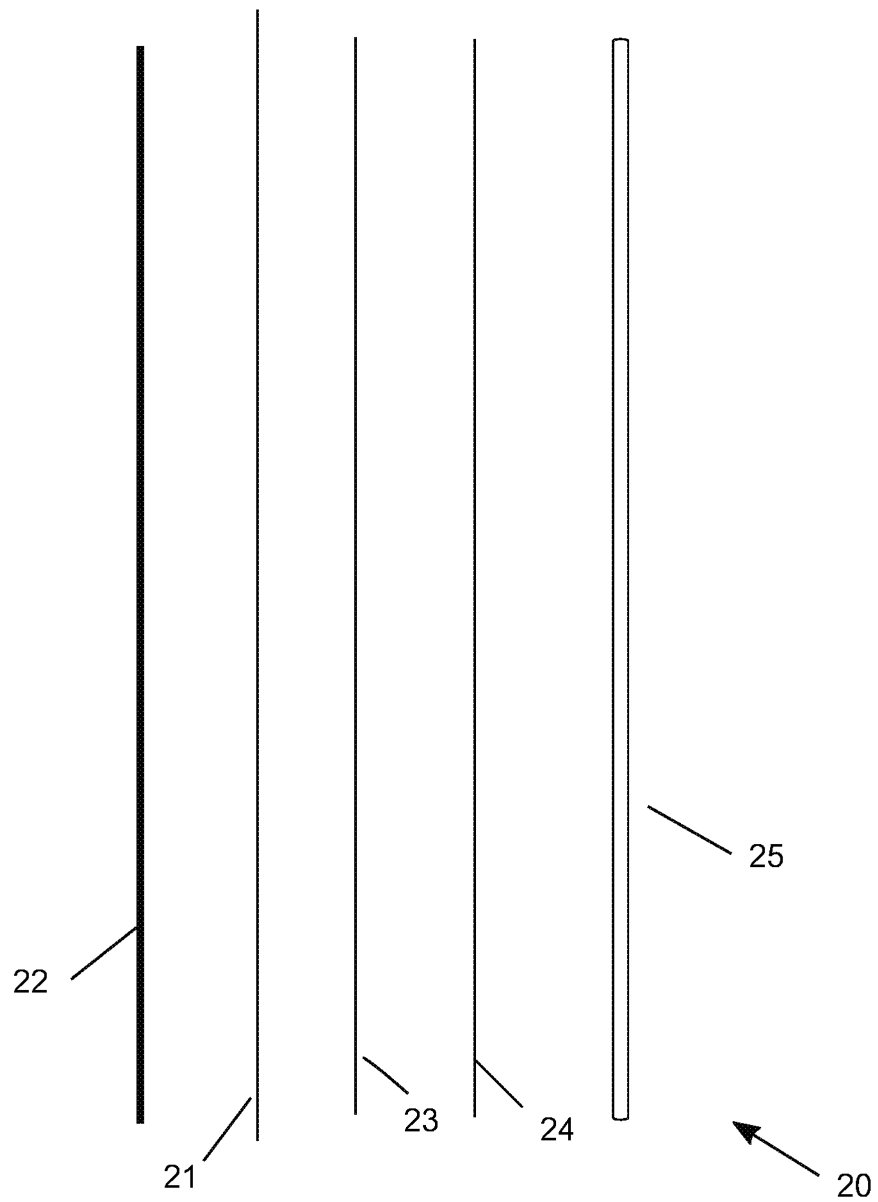
FIG. 7 is a side exploded side view of a second embodiment of the invention, showing the layers that make up a second embodiment panel.

FIG. 7 shows another embodiment 20 in which and aluminized BPET sheet 21 is sandwiched between a sheet of industrial paper 22, a reflective barrier 23, and a layer of self-sealing asphalt 24 before attaching it to an OSB sheet 25. This makes the wall panel waterproof and airtight and helps to keep intact the integrity of the engineered wood when used in an exterior application. Note that even though the aluminized BPET sheet 21, the industrial paper 22, the reflective barrier 23, and a layer of self-sealing asphalt 24 are shown separately in FIG. 7, they can be combined into one integral sheet that is then attached to the OSB sheet 24.

Figure 8:
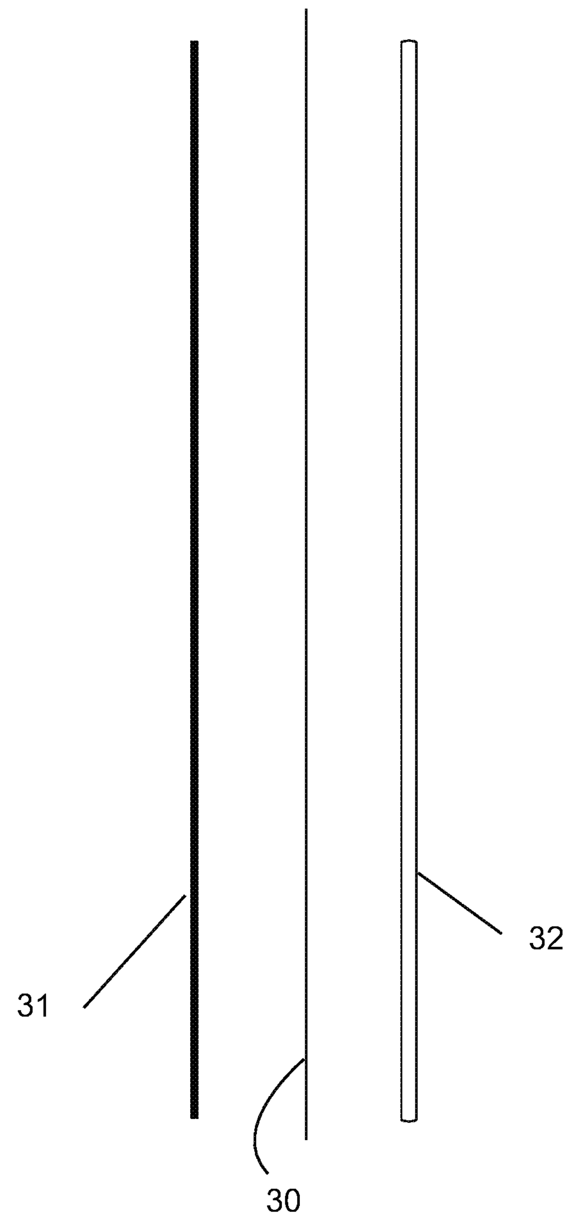
FIG. 8 is a side exploded side view of a third embodiment of the invention, showing an aluminized BPET sheet between a layer of insulation or particle (chipped) wood and an OSB sheet.

It is also possible to install an aluminized BPET sheet 30 between a layer of insulation or particle (chipped) wood 31 and an OSB sheet 32. This is another embodiment shown in FIG. 8.

Finally, it is also possible to provide an aftermarket application to any board or plywood sheet, both exterior and interior. In this case, the aluminized BPET sheet and industrial paper or similar material is applied to the drywall, gypsum board, or other type board by either a wholesaler, retailer, or contractor upon the request by customer. In this way, a builder can easily add the industrial paper and aluminized BPET sheet combination to almost any existing wall as desired. Moreover, retail shops can add the sheets to their inventory to expand their line of available products.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

We claim:

1. An engineered wood product comprising:

a) a sheet of industrial grade paper having a front and a back;

b) an insulating layer made up of a sheet of aluminized biaxially-oriented polyethylene terephthalate, also having a front and a back, two sides and a top, whereby the front of said insulating sheet of aluminized biaxially-oriented polyethylene terephthalate is attached to the back of the sheet of industrial grade paper; and c) a layer of oriented strand board (OSB) attached to the back of the insulating sheet of aluminized biaxially-oriented polyethylene terephthalate, producing a wall panel.

2. The engineered wood product of claim 1 wherein the front of the sheet of industrial grade paper has an imprinted natural wood grain appearance.

3. The engineered wood product of claim 1 wherein the industrial grade paper and insulating sheet of aluminized biaxially-oriented polyethylene terephthalate are formed as one sheet.

4. The engineered wood product of claim 1 wherein the wall panel is applied to a sheet of interior paneling.

5. The engineered wood product of claim 1 wherein the wall panel is applied to a sheet of drywall.

6. The engineered wood product of claim 1 wherein the insulating sheet of aluminized biaxially-oriented polyethylene terephthalate has an extension flap extending outwardly on one side and the top of the aluminized biaxially-oriented polyethylene terephthalate sheet.

7. The engineered wood product of claim 6 wherein the extension flap on one wall panel overlaps the extension flap on an adjacent wood panel when said wood panels are abutted together.

8. An engineered wood product comprising:

a) a sheet of industrial grade paper having a front and a back;

b) an insulating layer made up of a sheet of aluminized biaxially-oriented polyethylene terephthalate having a front and a back a top and two sides, the front of the sheet of aluminized biaxially-oriented polyethylene terephthalate being attached to the back of the sheet of industrial grade paper;

c) a reflective barrier having a front and a back wherein the front of the reflective barrier is adhered to the back of the insulating sheet of aluminized biaxially-oriented polyethylene terephthalate;

d) a layer of self-sealing asphalt also having a front and a back, being adhered to the back of the reflective barrier; and e) a sheet of OSB, adhered to the back of the layer of self-sealing asphalt, forming a waterproof and airtight wood panel.

9. The engineered wood product of claim 8 wherein the front of the sheet of industrial grade paper has an imprinted natural wood grain appearance.

10. The engineered wood product of claim 8 wherein the industrial grade paper and insulating sheet of aluminized biaxially-oriented polyethylene terephthalate are formed as one sheet.

11. The engineered wood product of claim 8 wherein the insulating sheet of aluminized biaxially-oriented polyethylene terephthalate has an extension flap extending outwardly on one side and the top of the aluminized biaxially-oriented polyethylene terephthalate sheet.

12. The engineered wood product of claim 11 wherein the extension flap on one wall panel overlaps the extension flap on an adjacent wood panel when said wood panels are abutted together.

13. An engineered wood product comprising:

a) a layer of insulation, having a front and a back;

b) a second insulating layer made up of a sheet of aluminized biaxially-oriented polyethylene terephthalate having a front and a back a top and two sides, wherein the front of the sheet of aluminized biaxially-oriented polyethylene terephthalate is attached to the back of the layer of insulation; and c) an OSB sheet attached to the back of the sheet of aluminized biaxially-oriented polyethylene terephthalate, forming a wood panel.

14. The engineered wood product of claim 8 wherein the insulating sheet of aluminized biaxially-oriented polyethylene terephthalate has an extension flap extending outwardly on one side and the top of the aluminized biaxially-oriented polyethylene terephthalate sheet.

15. The engineered wood product of claim 11 wherein the extension flap on one wall panel overlaps the extension flap on an adjacent wood panel when said wood panels are abutted together.

16. An engineered wood product comprising:

a) a layer of insulation, having a front and a back;

b) a second insulating layer made up of a sheet of aluminized biaxially-oriented polyethylene terephthalate having a front and a back a top and two sides, wherein the front of the sheet of aluminized biaxially-oriented polyethylene terephthalate is attached to the back of the layer of insulation; and c) a sheet of particle board attached to the back of the sheet of aluminized biaxially-oriented polyethylene terephthalate, forming a wood panel.

17. The engineered wood product of claim 16 wherein the insulating sheet of aluminized biaxially-oriented polyethylene terephthalate has an extension flap extending outwardly on one side and the top of the aluminized Mylar sheet.

18. The engineered wood product of claim 17 wherein the extension flap on one wall panel overlaps the extension flap on an adjacent wood panel when said wood panels are abutted together.

* * * * *